United States Patent [19]
Yu

[11] Patent Number: 5,644,367
[45] Date of Patent: Jul. 1, 1997

[54] COLOR TRACKING METHOD OF A DISPLAY DEVICE WHEN BRIGHTNESS LEVEL THEREOF IS VARIED

[75] Inventor: Kuo-Chin Yu, Taoyuan, Taiwan

[73] Assignee: Acer Peripherals Inc., Taoyuan, Taiwan

[21] Appl. No.: 407,578

[22] Filed: Mar. 20, 1995

[51] Int. Cl.$^6$ .............................. H04N 9/73; H04N 5/57
[52] U.S. Cl. .................. 348/656; 348/687; 348/673
[58] Field of Search ...................................... 348/671, 673, 348/687, 656, 655; 345/22; H04N 9/73, 5/14, 5/57

[56] References Cited

U.S. PATENT DOCUMENTS

| | | |
|---|---|---|
| 4,118,729 | 10/1978 | Shanley, II . |
| 5,400,086 | 3/1995 | Sano .......................... 348/678 |

Primary Examiner—Sherrie Hsia
Attorney, Agent, or Firm—Meltzer, Lippe, Goldstein et al.

[57] ABSTRACT

The invention is provided to automatically track the color regardless of the adjustment of the brightness level of a display device. The method provided comprises the first step of calculating a bias voltage, Rb, Gb, Bb, for the Red, Green and Blue cathode respectively, responsive to a brightness voltage applied to the control grid terminal, such that the condition of (Rb−G):(Gb−G):(Bb−G)=(Rbmin−Gmin):(Gbmin−Gmin):(Bbmin−Gmin) holds. The second step of the invention is to output the Rb, Gb, Bb obtained in the first step to each bias voltage input terminal of the video control circuit for the Red, Green and Blue cathode respectively, such that the color of the display device is independent from the change of the brightness value G.

2 Claims, 4 Drawing Sheets

COLOR TRACKING METHOD OF A DISPLAY DEVICE WHEN BRIGHTNESS LEVEL THEREOF IS VARIED

TECHNICAL FIELD OF INVENTION

This invention relates to the color, or gray scale, tracking of the display device.

BACKGROUND OF THE INVENTION

It is well known that the outputs from the cathode terminal for Red, Green and Blue of the color cathode ray tube (CRT) must be well tuned to reach a balance allowing an intermediate Whiteness is obtained when the color signal is absent. Besides, the required proportion of the Red, Green and Blue color to generate the Whiteness must be kept same, regardless of the adjustment of the Brightness control button accessible by the users, in order to have a color temperature independent from the Brightness level. The above function is generally known as color tracking or gray scale tracking which controls the outputs from Red, Green and Blue cathodes to have the same proportion at all Brightness levels ranging from the maximum brightness to minimum brightness.

In recent days, some CRT users in particular areas, e.q. computer-aided graphics, computer-aided desktop publishing, request a very high level of color tracking capability. They, typically, request the color temperature be unchanged when the brightness level or contrast level is adjusted. If the color tracking is not good enough, the raster may look a bit of yellow under one brightness level while a bit of blue under another brightness level.

Typically, the brightness level of the CRT is controlled by the voltage applied on the control grid terminal, also known as G1 terminal, within the CRT. Therefore, the manufactures of the display device employing the CRT typically adopt a narrow adjustable range of the applied voltage, or add compensation circuit in Red, Green and Blue clamping circuit, in order to assure a good color tracking capability.

In light of the above mentioned stringent request for color tracking capability of the CRT, one object of the invention is to provide a method to automatically track the color regardless of the adjustment of the brightness level.

SUMMARY OF INVENTION

The method provided comprises the first step of calculating a bias voltage, Rb, Gb, Bb, for the Red, Green and Blue cathode respectively, responsive to a voltage value G applied to the control grid terminal, such that the condition of (Rb−G):(Gb−G):(Bb−G)=(Rbmin−Gmin):(Gbmin−Gmin):(Bbmin−Gmin) holds. The second step of the invention is to output the Rb, Gb, Bb obtained in the first step to each bias voltage input terminal of the video control circuit for the Red, Green and Blue cathode respectively, whereby the color of the display device is independent from the change of the voltage value G.

In a preferred embodiment, the Rb, Gb, Bb is obtained by the following formulas:

$$Rb = \frac{Rbmax - Rbmin}{Gmax - Gmin}(G - Gmin) + Rbmin,$$

$$Gb = Gbmax = Gbmin,$$

-continued $$Bb = \frac{Bbmax - Bbmin}{Gmax - Gmin}(G - Gmin) + Bbmin.$$

Wherein Gmax is the applied voltage on the control grid terminal when the brightness control is set to a maximum, Gmin is the applied voltage on the control grid terminal when the brightness control is set to a minimum, G is the applied voltage on the control grid terminal when the brightness control is set between the maximum and the minimum, Rbmax, Gbmax and Bbmax is respectively the bias voltage applied to the bias input terminal for the Red, Green and Blue cathode when the brightness control is set to the maximum and the display device shows a predetermined color temperature, Rbmin, Gbmin and Bbmin respectively is the bias voltage applied to the bias input terminal for the Red, Green and Blue cathode when the brightness control is set to the minimum and the display device shows the predetermined color temperature.

DETAILED DESCRIPTION OF THE PREFERRED EMBODIMENT

Figure 1:
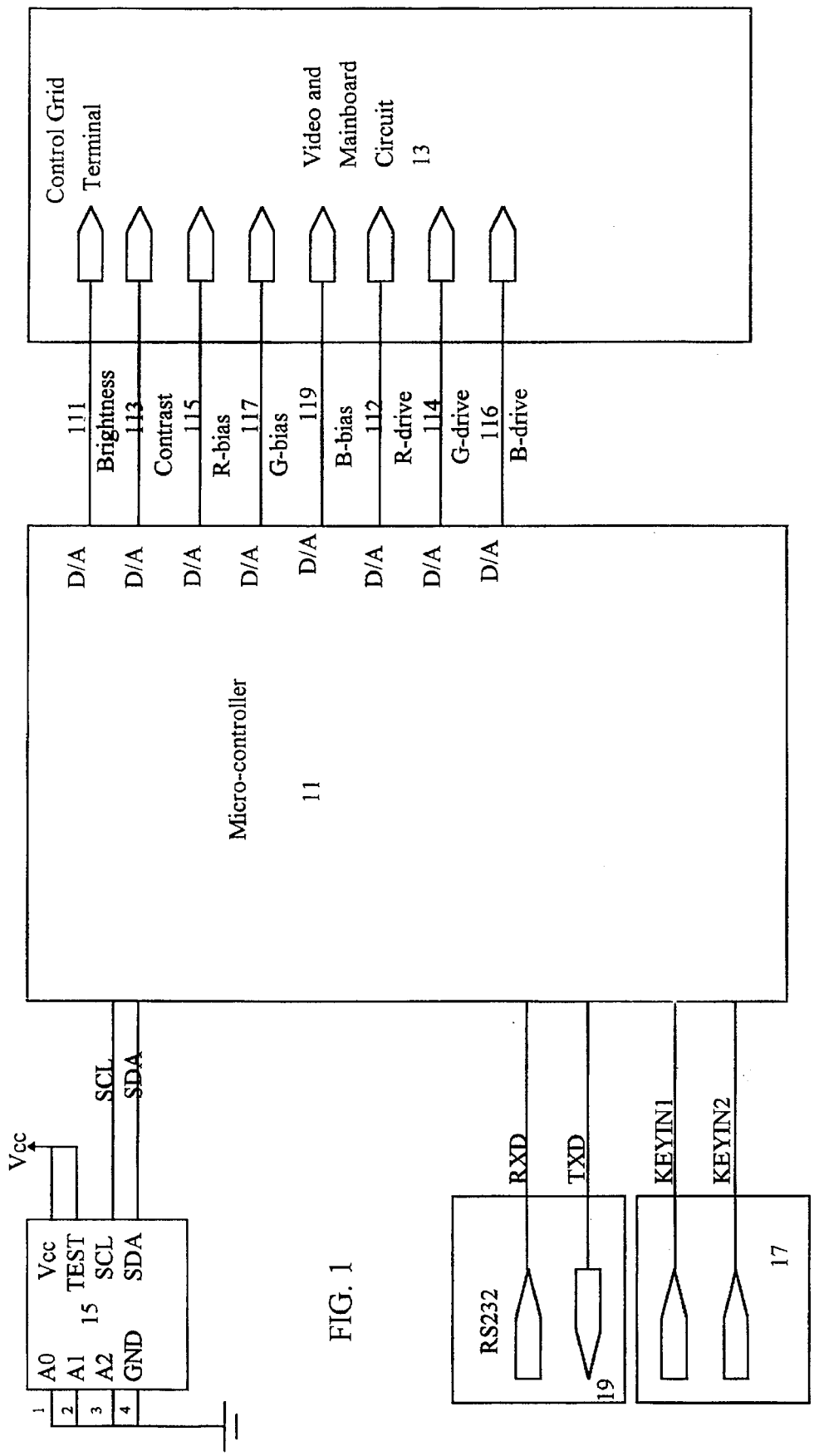
FIG. 1 shows the hardware in block forms applicable to the method of the invention

Referring to FIG. 1 first, the associated hardware functional blocks of a typical digital color monitor circuit is shown to include a micro-controller 11 coupled to the storage device 15, the RS-232 communication interface 19, the front panel circuit 17, and the monitor video circuit 13 respectively. A typical storage device 15 is an Erasable Electrical Programmable read only memory (EEPROM). The shown RS-232 interface 19 is coupled to the micro-controller 11 only at the final adjustment stage of CRT and is removed after the adjustment is completed. The digitally controlled display device is operating under the control of the program and parameter values stored in the storage device 15 in a well known manner. Responsive to the signals on the control lines including brightness control 111, contrast control 113, Red-bias control 115, Green-bias control 117, Blue-bias control 119, Red-drive control 112, Green-drive control 114, and Blue-drive control 116, the video circuit 13 controls the display of the CRT (not shown) as requested by the user. If the user intends to adjust the display, he or she adjusts the corresponding button on the front or side panel of the display device and the message therefrom arrives at the micro-controller 11 via the lines KEYIN1 and KEYIN2. In response, the micro-controller 11, which operates under the control of the program in the storage device 15, generates at least one control signal mentioned above to the video circuit 13.

From the characteristics data of the CRT supplied from the manufacture, it has been known, while keeping a predetermined color temperature, the ratio between the effective voltage applied to the cathode terminal for Red, Green and Blue of each CRT is always the same. In other words, the following equation (1.1) holds.

$$(Rbmax-Gmax):(Gbmax-Gmax):(Bbmax-Gmax)=(Rbmin-Gmin):$$

$$(Gbmin-Gmin):(Bbmin-Gmin)=$$
$$(Rb-G):(Gb-G):(Bb-G) \quad \text{Equation (1.1)}$$

Wherein G max is the applied voltage on the control grid terminal when the brightness control is set to a maximum, Gmin is the applied voltage on the control grid terminal when the brightness control is set to a minimum, G is the applied voltage on the control grid terminal when the brightness control is set between the maximum and the minimum, Rbmax, Gbmax and Bbmax is respectively is the bias voltage applied to the bias input terminal for the Red, Green and Blue cathode when the brightness control is set to the maximum and the display device shows the predetermined color temperature, Rbmin, Gbmin and Bbmin respectively is the bias voltage applied to the bias input terminal for the Red, Green and Blue cathode when the brightness control is set to the minimum and the display device shows the predetermined color temperature. Rb, Gb and Bb respectively is the bias voltage applied to the bias input terminal for Red, Green and Blue cathode when the value of G is applied on the control grid terminal and the display device shows the predetermined color temperature.

First, to simplify the description of the method of the invention, the bias voltage applied to the Green cathode is kept fixed, such that Gb=Gbmax=Gbmin. To the cathode of the Red and Green, the following equation (1.2) is resulted due to the fact that condition of a/b=c/d implies the condition of a/b=c/d=(a−c)/(b−d).

$$\frac{Rbmax - Gmax}{Gbmax - Gmax} = \frac{Rbmin - Gmin}{Gbmin - Gmin} = \quad \text{Equation (1.2)}$$

$$\frac{Rbmax - Rbmin + Gmin - Gmax}{Gbmax - Gbmin + Gmin - Gmax} =$$

$$\frac{(Rbmax - Rbmin) + (Gmin - Gmax)}{Gmin - Gmax} = \frac{Rbmax - Rbmin}{Gmin - Gmax} + 1$$

It has been found, if the bias voltage applied are controlled in the following manner shown in Equation (1.3), during the change of the brightness level, the ratio expressed in equation (1.1) will still be kept and the color temperature is then kept the same as desired.

$$Rb = \frac{Rbmax - Rbmin}{Gmax - Gmin}(G - Gmin) + Rbmin,$$

$$Gb = Gbmax = Gbmin,$$

$$Bb = \frac{Bbmax - Bbmin}{Gmax - Gmin}(G - Gmin) + Bbmin \quad \text{Equation (1.3)}$$

The following manipulations prove above recitations.

$$\frac{Rb-G}{Gb-G} = \frac{\frac{Rbmax - Rbmin}{Gmax - Gmin}(G - Gmin) + Rbmin - G}{Gb-G} = \quad \text{Equation (1.4)}$$

$$\frac{\frac{Rbmax - Rbmin}{Gmax - Gmin}(G - Gmin) + (Gmin - G) + (Rbmin - Gmin)}{(Gmin - G) + (Gbmin - Gmin)} =$$

$$\frac{\frac{Rbmax - Rbmin}{Gmin - Gmax}(Gmin - G) + (Gmin - G) + (Rbmin - Gmin)}{(Gmin - G) + (Gbmin - Gmin)}$$

From Equation (1,2), $$\frac{Rbmin - Gmin}{Gbmin - Gmin} = \frac{Rbmax - Rbmin}{Gmin - Gmax} + 1,$$

we obtain Equation (1.5), due to the fact that the condition of a/b=c/d implies condition of a/b=c/d=(a+c)/(b+d).

$$\frac{Rbmin - Gmin}{Gbmin - Gmin} = \quad \text{Equation (1.5)}$$

$$\frac{\frac{Rbmax - Rbmin}{Gmin - Gmax}(Gmin - G) + (Gmin - G)}{(Gmin - G)} =$$

$$\frac{\frac{Rbmax - Rbmin}{Gmin - Gmax}(Gmin - G) + (Gmin - G) + (Rbmin - Gmin)}{(Gmin - G) + (Gbmin - Gmin)}$$

However, since Equation (1.5) equals to Equation (1.4), we obtain $$\frac{Rb - G}{Gb - G} = \frac{Rbmin - Gmin}{Gbmin - Gmin}. \quad \text{Equation (1.6)}$$

In a similar manipulation, we obtain $$\frac{Bb - G}{Gb - G} = \frac{Bbmin - Gmin}{Gbmin - Gmin}. \quad \text{Equation (1.7)}$$

From Equation (1.6) and (1.7), we obtain $$(Rb-G):(Gb-G):(Bb-G) = (Rbmin-Gmin):(Gbmin-Gmin):(Bbmin-Gmin) \quad \text{Equation (1.8)}$$

The above manipulation proves that as long as the micro-controller 11 operates the video circuit 13 in accordance with the Equation (1.3), in events that the G value varies in response to the adjustment of the brightness control, the proportion between the effective voltages for R, G and B cathode is kept the same and the same color temperature is always tracked by the invention.

In Equation (1.3), values for Rbmax, Gbmax, Bbmax, Rbmin, Gbmin and Bbmin are required to calculate to the Rb, Gb and Bb.

Figure 2:
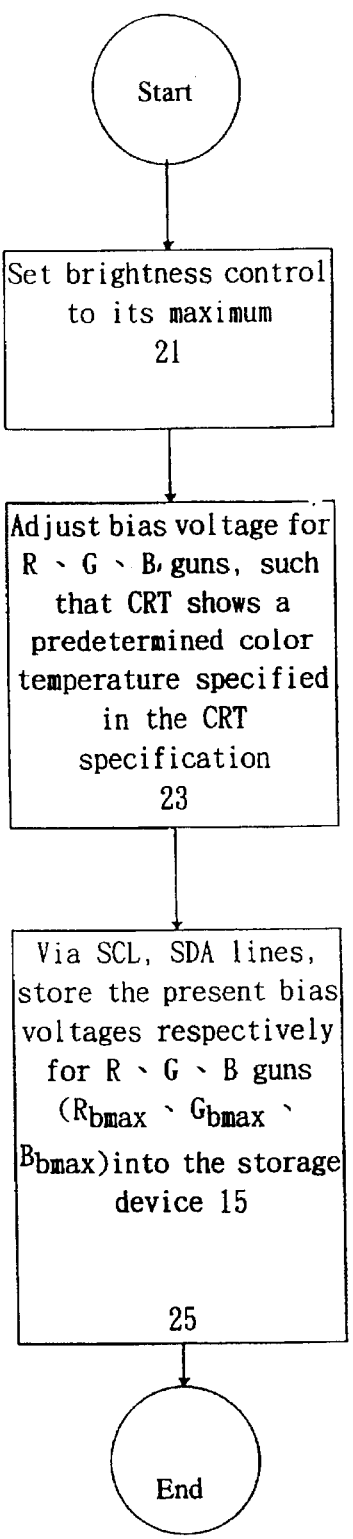
FIG. 2 shows the flow chart conducting a Darkness balance adjustment.

In the well known Darkness balance adjustment procedure outlined in FIG. 2, in block 21, the brightness control button is set to its maximum first, and thereafter, in block 23, instruct the micro-controller 11 via RS-232 interface to adjust and output the bias voltage for R, G and B cathode such that the display device shows a predetermined color temperature as specified in the CRT specification. In block 25, instruct the micro-controller 11 to store the Rbmax, Gbmax and Bbmax values into the storage device 15 via SCL and SDA lines.

Figure 3:
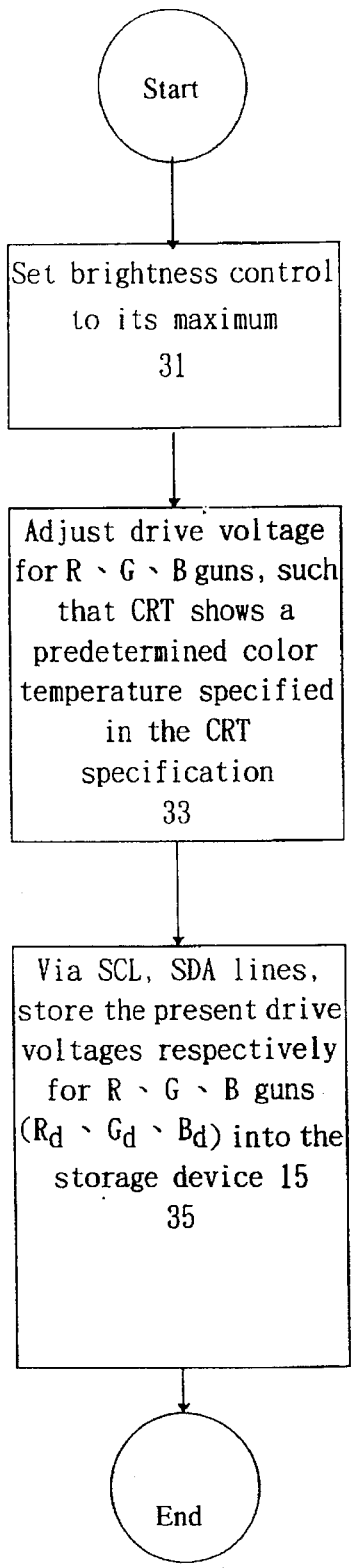
FIG. 3 shows the flow chart conducting a Whiteness balance adjustment.

In the well known Whiteness balance adjustment procedure outlined in FIG. 3, in block 31, the brightness control button is set to its maximum first, and thereafter, in block 33, instruct the micro-controller 11 via RS-232 interface to adjust and output the drive voltage, Rd, Gd and Bd, for R, G and B cathode such that the display device shows the predetermined color temperature. In block 35, instruct the micro-controller 11 to store the Rd, Gd and Bd values into the storage device 15 via SCL and SDA lines.

Figure 4:
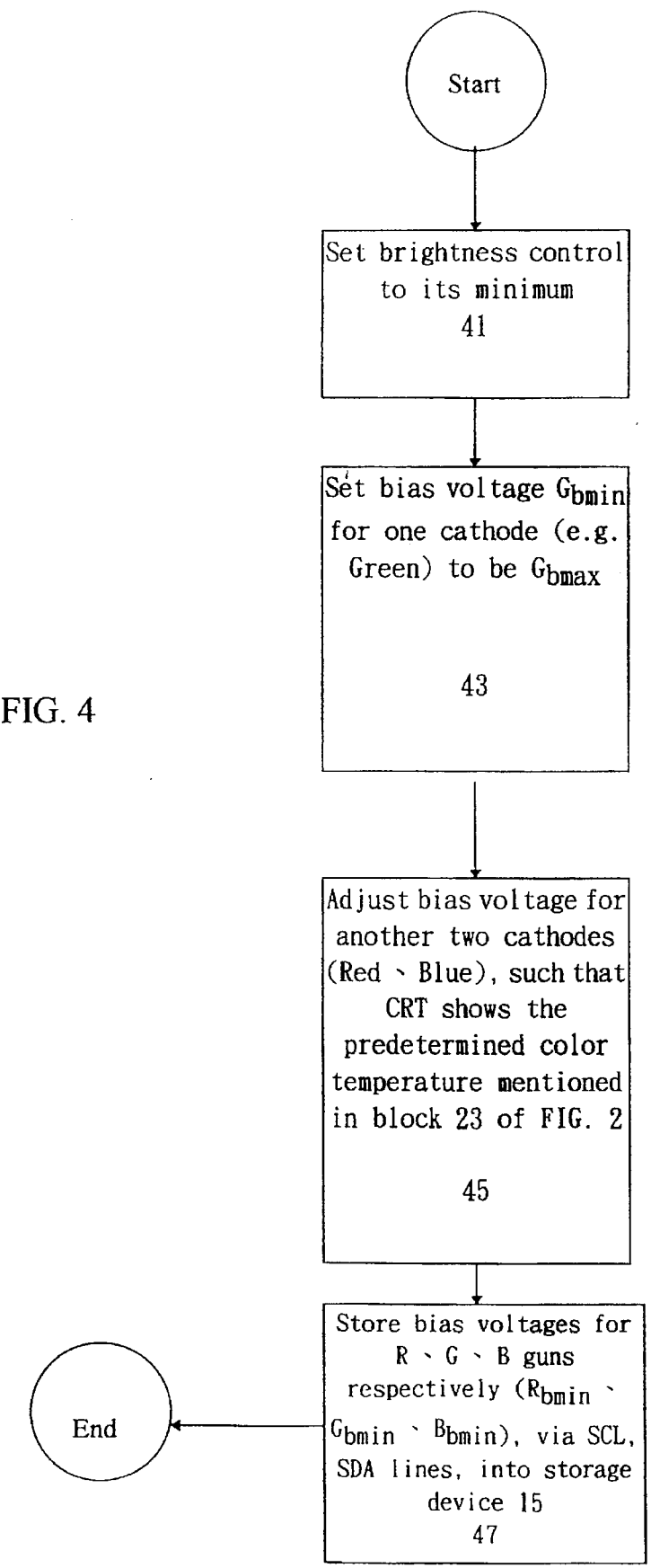
FIG. 4 shows the flow chart conducting a Darkness balance modification.

Following the above procedures, a Darkness balance modification procedure in FIG. 4 is provided by the invention. In block 41, the brightness control button is set to its minimum first, and thereafter, in block 43, instruct the micro-controller 11 via RS-232 interface to set the bias voltage Gbmin for one cathode, e.g. Green cathode, to be Gbmax, and, in block 45, adjust the bias voltage for another two cathodes, Red and Blue, such that the display device shows the predetermined color temperature. In block 47, instruct the micro-controller 11 to store the Rbmin, Gbmin and Bbmin values into the storage device 15 via SCL and SDA lines. It is to be noted Gbmin=Gbmax after this modification procedure is adopted. It is known the instructions to the micro-controller 11 may be in form of software coding techniques.

Once the user adjusts the brightness control button and, as a result, changes the voltage applied on the G1 terminal, the micro-controller 11, in response, calculates a new set of value for Rb, Gb and Bb in accordance with the Equation (1.3) and outputs these values to control the video circuit 13 via signal lines 115, 117 and 119 such that the Equation (1.1) still holds after the change of the brightness level. It is known from the characteristics of the CRT, the color temperature is still the same regardless of the different brightness level adjusted.

What is claimed is:

1. A color tracking method of a display device, the display device including a brightness control, a Red, green, Blue cathode, a control grid terminal for receiving a brightness voltage and a video circuit, the video circuit having a bias voltage input terminal for each Red, Green and Blue cathode respectively for receiving a bias voltage, comprising the steps of:

(1) Calculating the bias voltage, Rb, Gb, Bb, for the Red, Green and Blue cathode respectively, responsive to the brightness voltage applied to the control grid terminal, such that a condition of (Rb–G):(Gb–G):(Bb–G)= (Rbmin–Gmin):(Gbmin–Gmin):(Bbmin–Gmin) holds, wherein G is the brightness voltage, Gmin is the brightness voltage on the control grid terminal when the brightness control is set to a minimum, Rbmin, Gbmin and Bbmin respectively is the bias voltage applied to each bias voltage input terminal when the brightness control is set to the minimum and the display device shows a predetermined color temperature;

(2) Outputting the Rb, Gb, Bb to each bias voltage input terminal respectively, such that the color of the display device is independent from the change of the brightness voltage G.

2. The method as recited in claim 1, wherein the Rb, Gb, Bb is obtained by the following formulas $$Rb = \frac{Rb\max - Rb\min}{G\max - G\min} (G - G\min) + Rb\min$$

$$Gb = Gb\max = Gb\min$$

$$Bb = \frac{Bb\max - Bb\min}{G\max - G\min} (G - G\min) + Bb\min,$$

wherein Gmax is the brightness voltage on the control grid terminal when the brightness control is set to a maximum, Rbmax, Gbmax and Bbmax is the bias voltage applied to each bias voltage input terminal respectively when the brightness control is set to the maximum and the display device shows the predetermined color temperature.

* * * * *